(12) United States Patent
Lam et al.

(10) Patent No.: US 6,925,578 B2
(45) Date of Patent: Aug. 2, 2005

(54) FAULT-TOLERANT SWITCH ARCHITECTURE

(75) Inventors: An H. Lam, Houston, TX (US); Sompong P. Olarig, Pleasanton, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 461 days.

(21) Appl. No.: 09/967,602

(22) Filed: Sep. 29, 2001

(65) Prior Publication Data

US 2003/0065974 A1 Apr. 3, 2003

(51) Int. Cl.[7] ............................................... G06F 11/16
(52) U.S. Cl. ........................ 714/4; 714/11; 714/43; 714/56; 370/226; 370/243; 370/244; 370/246
(58) Field of Search ........................... 714/4, 11, 43, 714/56, 713, 747, 776, 819, 820, 821; 370/226, 243, 244, 246, 274, 492

(56) References Cited

U.S. PATENT DOCUMENTS

| | | | | |
|---|---|---|---|---|
| 4,949,340 A | * | 8/1990 | Smith et al. | 370/226 |
| 5,859,959 A | * | 1/1999 | Kimball et al. | 714/4 |
| 5,919,266 A | | 7/1999 | Sud et al. | |
| 6,052,753 A | * | 4/2000 | Doerenberg et al. | 710/305 |
| 6,088,439 A | | 7/2000 | Martz et al. | |
| 6,128,729 A | * | 10/2000 | Kimball et al. | 713/1 |
| 6,431,765 B1 | * | 8/2002 | Chen et al. | 385/92 |
| 6,600,727 B1 | * | 7/2003 | Mackay | 370/293 |

OTHER PUBLICATIONS

Pippenger, Nicholas and G. Lin, *Fault–Tolerant Circuit–Switching Networks*, Department of Computer Science—The University of British Columbia, Canada, pp. 229–235 (Jun. 1992).

*Technology Brief: Infiniband Architectural Technology*, Compaq Computer Corporation, pp. 1–14 (Jul. 2000).

* cited by examiner

Primary Examiner—Robert Beausoliel
Assistant Examiner—Joseph D Manoskey (57) ABSTRACT

A computer network employs a fault-tolerant or redundant switch architecture. The network includes redundant data paths coupling end nodes and switches. Fault-tolerant repeaters (FTRs) can be stand-alone devices or can be incorporated into the switches. Using error detection, the FTR checks to see if the data is good on all paths. If the data received on one path is "bad" and the data is "good" on another path, the FTR transmits the "good" data in place of the "bad" data. For any switch, a pair of incoming ports may be configured as redundant incoming ports and a pair of outgoing ports may be configured as redundant outgoing ports.

36 Claims, 7 Drawing Sheets

FAULT-TOLERANT SWITCH ARCHITECTURE

CROSS-REFERENCE TO RELATED APPLICATIONS

None.

STATEMENTS REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

The present invention generally relates to fault-tolerant computing and more particularly to a fault tolerant or redundant switch architecture.

2. Description of the Related Art

Various aspects of a computer network are of concern to end users, including transmission rates and reliability of data. In addition, in certain applications, such as financial transactions, a computer network is typically designed to be fault-tolerant in certain respects.

In terms of fault tolerance, prior computer systems used completely dual redundant hardware. That is, communication devices such as nodes and switches were incorporated into a computer network, such that if one set of hardware failed, the redundant set could provide the data transmission. For example, Compaq Computer Corp. (the assignee of the present application), uses X and Y planes to provide dual hardware redundancy through a System Area Network (SAN). This computer network system, also known to utilize ServerNet™ technology, utilizes parallel sets of hardware, including communications and storage devices to provide fault tolerant capabilities. This duplication of hardware can be very expensive.

Another type of known fault-tolerant computer system utilizes redundant central processing units (CPUs). CPUs run lock-step with one another wherein one CPU is a master and the other is a slave. Should the master CPU fail, the slave CPU takes over the master's functions. Although this approach requires less hardware than the above dual redundant system, this system only covers faults relating to the CPUs. Although less hardware extensive and thus less expensive, this known approach does not provide overall fault coverage, e.g., fault coverage between a CPU bus and the rest of the network.

BRIEF SUMMARY OF THE INVENTION

A computer network employs a fault-tolerant or redundant switch architecture. The network includes redundant data paths coupling end nodes and switches. Fault-tolerant repeaters (FTRs) can be stand-alone devices or can be incorporated into the switches. Using error detection, the FTR checks to see if the data is good on all paths. If the data received on one path is "bad" and the data is "good" on another path, the FTR transmits the "good" data in place of the "bad" data. For any switch, a pair of incoming ports may be configured as redundant incoming ports and a pair of outgoing ports may be configured as redundant outgoing ports.

BRIEF DESCRIPTION OF THE SEVERAL VIEWS OF THE DRAWINGS

A better understanding of the present invention can be obtained with the following detailed description of the preferred embodiment is considered in conjunction with the following drawings, in which.

DETAILED DESCRIPTION OF THE INVENTION

Figure 1:
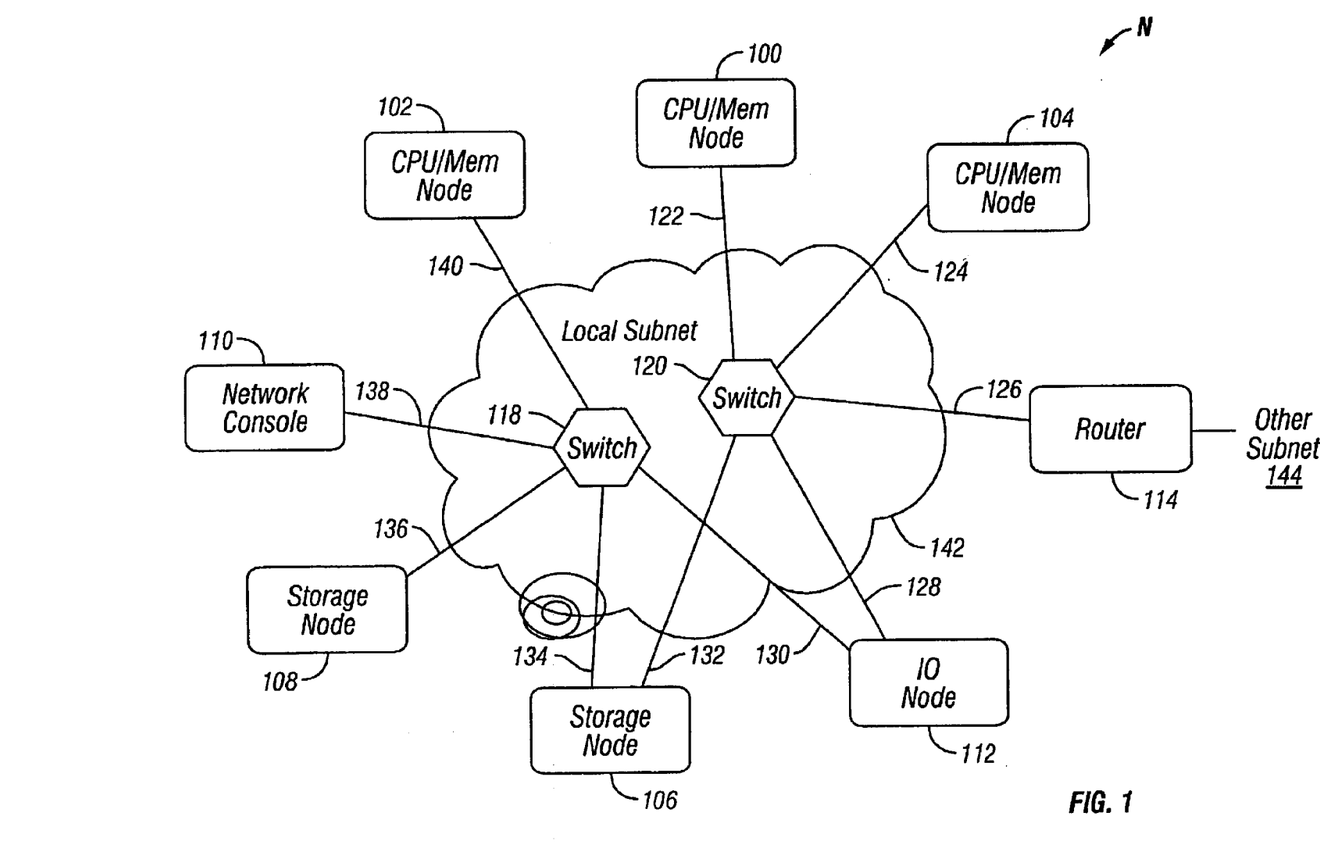
FIG. 1 shows a typical computer system in which the techniques of this invention can be implemented.

Turning to FIG. 1, shown is a system diagram of a computer network N. The computer network N includes various end nodes, switches, and data paths that can be coupled to other computer networks. The computer network N includes as end nodes, Central Processing Unit (CPU)/Memory or Computing Nodes 100, 102, 104, Storage Nodes 106 and 108, a Network Console 110, and an Input/Output (I/O) node 112. The end nodes are coupled to switches 118 and 120, via data paths 122, 124, 126, 128, 130, 132, 134, 136, 138, and 140. The end nodes, switches and data paths can be included in a local network 142. The local network 142 can be coupled to another network 144 via a router 114.

The CPU/Memory Nodes 100, 102, and 104 can represent a host platform or server containing a set of processors and memories. The Storage Nodes 106 and 108 can represent a set of disk drives that stores various data, such as financial data. The Network Console 110 can represent a console for monitoring parameters of the network 142. The I/O node 112 can contain I/O resources such as a RAID subsystem.

Figure 2:
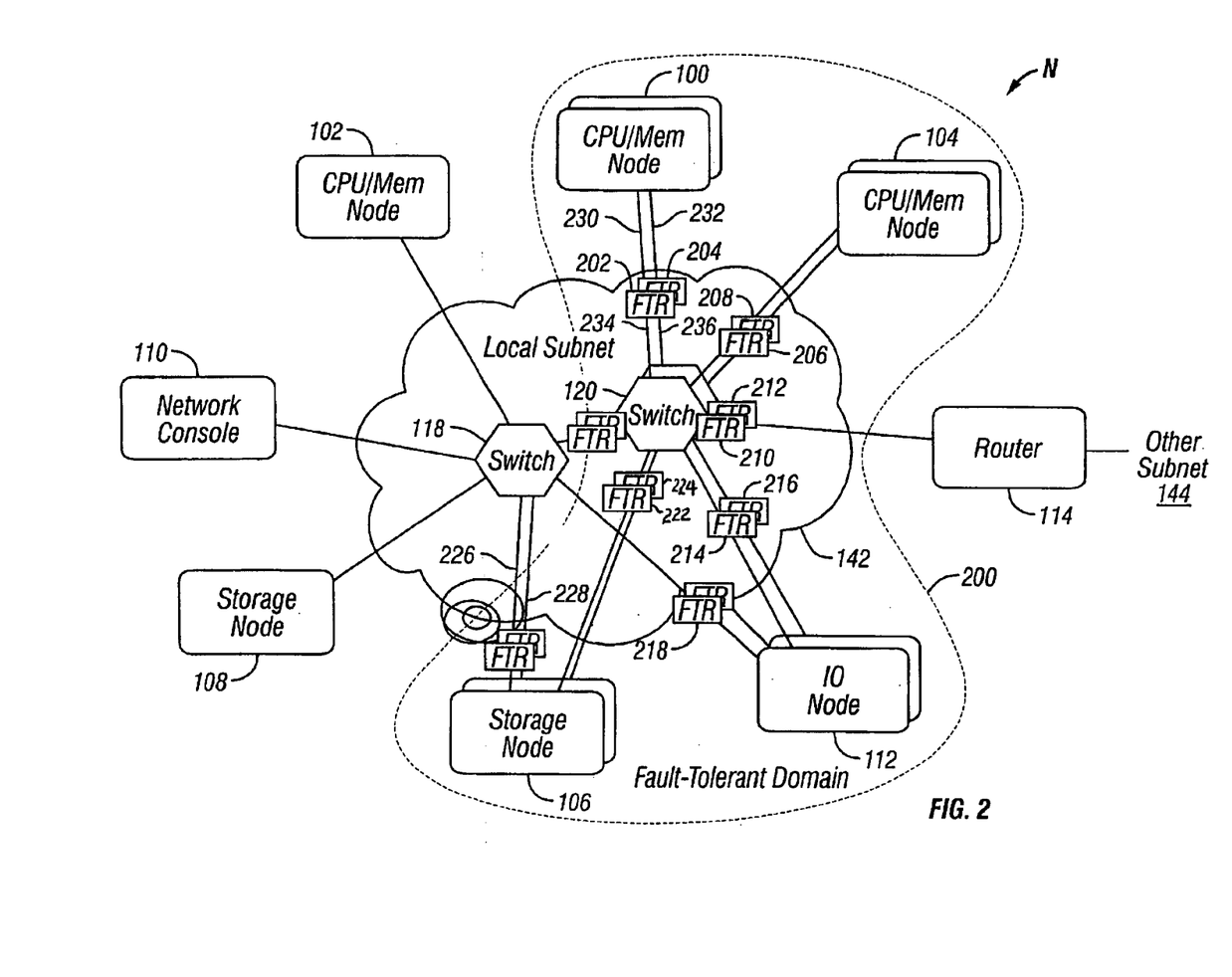
FIG. 2 is a diagram of a fault-tolerant computer network with data paths incorporating discrete fault-tolerant repeaters (FTR)

FIG. 2 illustrates a fault-tolerant computer network N with discrete fault-tolerant repeaters (FTR) according to the present invention. The computer network N, which can be a storage area network (SAN), includes a fault-tolerant domain 200. The fault-tolerant domain 200 includes a network of various devices that incorporate fault capabilities. The fault-tolerant devices can include existing end nodes, such as CPU/Memory Nodes 100 and 104, the Storage Node 106, and the 1/0 Node 112. Such fault tolerant devices transmit/receive data on redundant parallel data paths (e.g. 226, 228, 230, 232, 234, 236). The end nodes are coupled to the switch 120 via various data paths. The data paths include fault-tolerant repeaters 202, 204, 206, 208, 210, 212, 214, 216, 218, 222, and 224. Thus, each data path within the fault-tolerant domain 200 includes a fault-tolerant repeater and each fault-tolerant device is associated with redundant parallel data paths.

In one embodiment, the data, typically packet data, from the various end nodes are transmitted over the various data paths coupled in parallel. For example, data paths 230 and 232 are parallel data paths from CPU/Memory Node 100 to FTRs 202 and 204, respectively. One of the data paths is arbitrarily assigned as "active" with the other(s) assigned as "stand-by." Although FIG. 2 shows dual redundant data paths, one skilled in the art would recognize that the number of redundant data paths could be more than two.

Figure 2A:
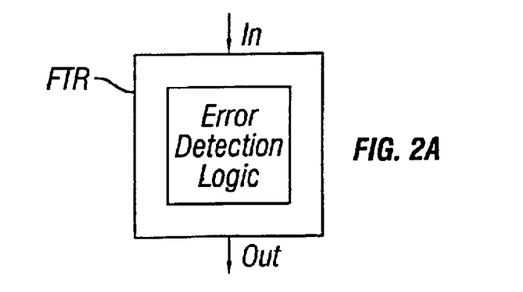
FIG. 2A is a diagram of a fault-tolerant repeater (FTR)

The fault-tolerant repeaters in FIG. 2 illustrate stand-alone devices. Data from an end node, for example, the CPU/Memory Node 100 enters into the FTRs 202 and 204. As illustrated in FIG. 2A, the FTRs 202 and 204 include error detection or checking logic (e.g., a Cyclical Redundancy Checking (CRC) algorithm) for ascertaining whether the data entering into the respective FTR is "good" or "bad." "Bad data" represents data containing certain errors, and "good data" represents data lacking those errors. If the FTR 202 or 204 determines that the data is "good," the FTR 202 or 204 retransmits the data along the data path. In this case, the data is transmitted to switch 120. If the FTR 202 or 204 determines that the data in a particular path is not "good," the FTR 202 or 204 will replace the "bad" data with "good" data and retransmit the "good" data to the switch 120. If there are no faults detected but the redundant data on each of the dual redundant data paths do not match one another, then the data on the "active" path is transmitted on both outputs of the FTRs. This embodiment generally provides for a faster response time for non-mission critical applications. For mission-critical applications, the FTRs 202 and 204 may notify a system manager (not shown) to have the end node 100 retransmit the data, rather than replacing the "bad" data with the "good" data.

Figure 3:
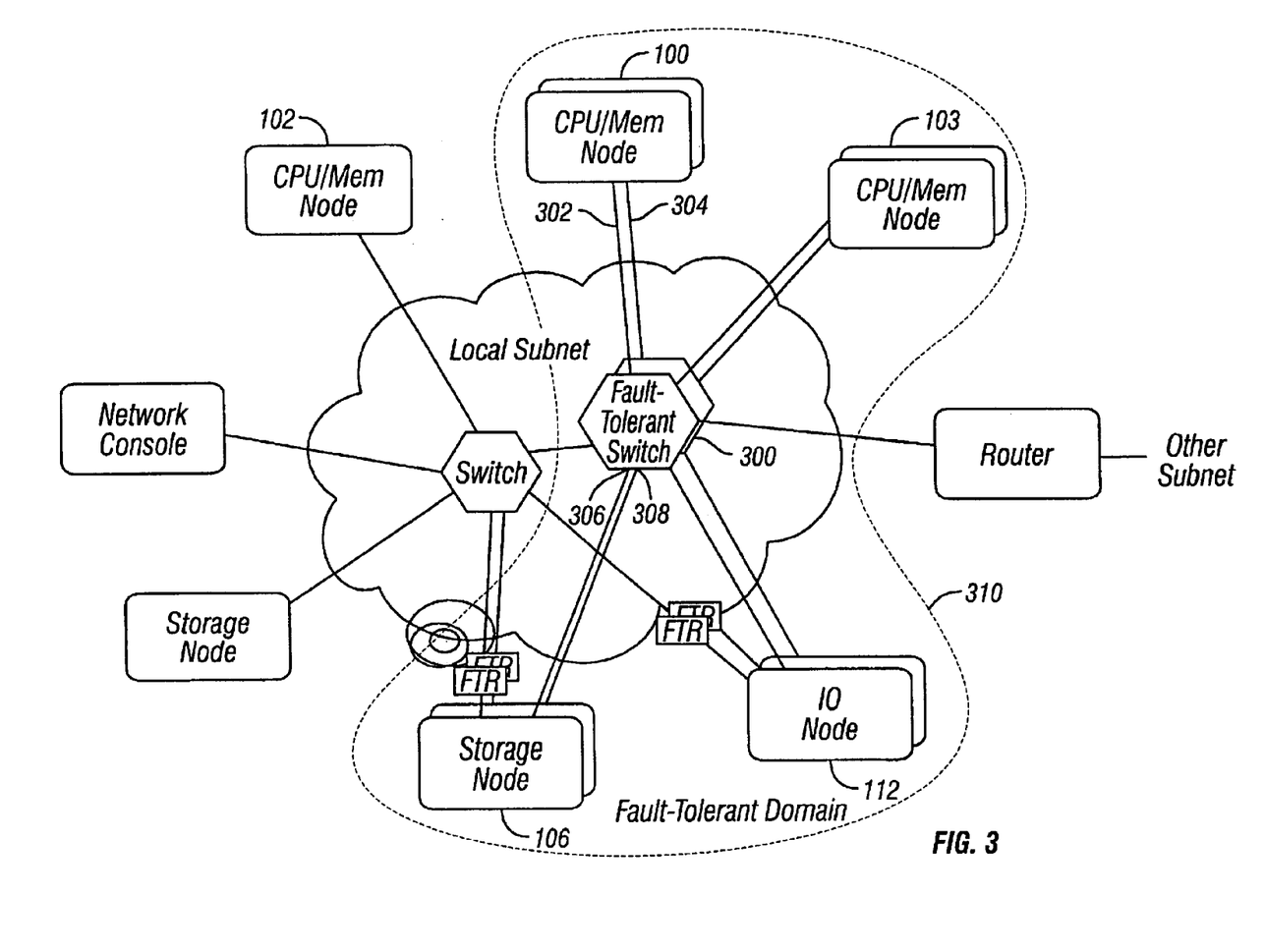
FIG. 3 is a diagram of a fault-tolerant computer network with fault-tolerant switches incorporating fault-tolerant repeaters (FTR)

FIG. 3 illustrates a computer network N employing a fault-tolerant switch 300 according to the present invention. Unlike FIG. 2 wherein the data paths include fault-tolerant repeaters, FIG. 3 illustrates the fault-tolerant repeaters as incorporated into a fault-tolerant switch 300. Within the fault-tolerant domain 310, one of the redundant parallel paths (e.g., data path 302 with redundant data path 304), is arbitrarily assigned as "active" while the other is assigned as "standby". Each of the redundant parallel paths is checked independently for faults utilizing an error detection algorithm, such as a CRC algorithm. If a fault is detected on one of the redundant parallel paths 302 or 304, the "good" data on the other path is transmitted on both outputs of the fault-tolerant switch 300 (For example, output 306 and output 308 of the fault-tolerant switch 300). If there are no faults detected but the redundant data do not match, the data on the "active" path is transmitted on both outputs of the fault-tolerant switch 300. This embodiment generally provides for a faster response time for non-mission critical applications. For mission-critical applications, the fault-tolerant switch 300 may notify a system manager (not shown) to have the end node retransmit the data, rather than replacing the "bad" data with the "good" data.

The fault-tolerant devices and redundant parallel data paths can be deployed with specific end nodes. Such deployment provides design flexibility since fault-tolerance capabilities can be provided to a certain region of a computer network. Furthermore, fault-tolerant repeaters can be used anywhere in a computer network requiring fault-tolerant capabilities, thus accommodating as much or as little fault tolerance as is desired. This use of redundancy also provides transparency from the rest of the network.

As mentioned above, one skilled in the art could recognize that there could be more than two redundant parallel paths. For example, there can be triple redundant parallel paths utilizing FTRs or fault tolerant switches incorporating FTRs. The triple redundant parallel paths can utilize a majority-voting scheme without all the data on the redundant parallel paths being identical. If the three redundant data streams are determined to be "good" but only data on two of the redundant parallel paths are the same, then the data on these two redundant paths are transmitted by the FTRs or fault-tolerant switches on the remaining path that did not have the matching data. If the data on all redundant parallel paths are determined to be "good", yet the data on all of the redundant parallel paths are different, the data on the "active" path is transmitted on the outputs of the other "standby" redundant data paths by the FTRs or the fault tolerant switches. This majority-voting scheme generally provides better reliable data.

Figure 4:
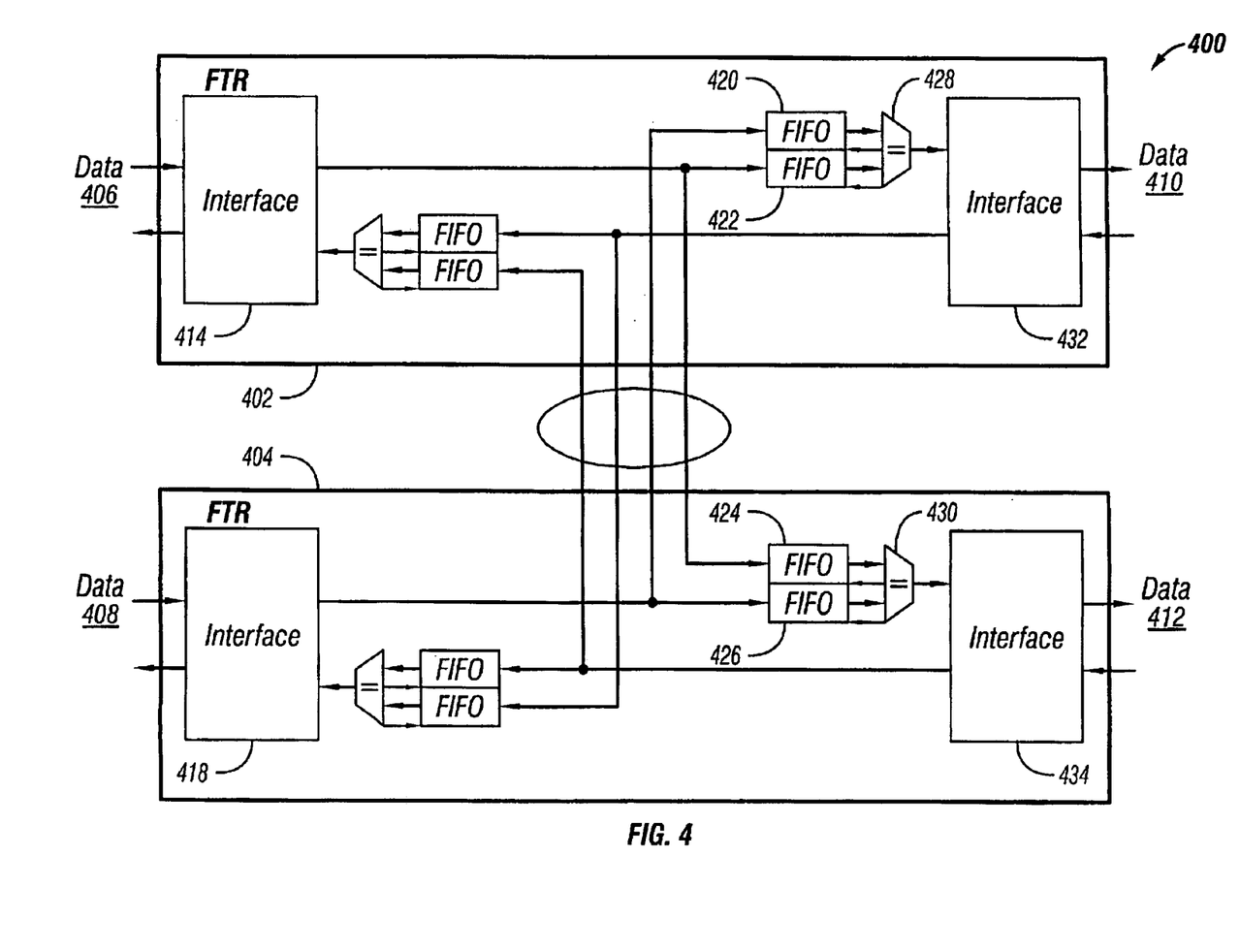
FIG. 4 is a block diagram of dual redundant fault-tolerant repeaters (FTRs)

FIG. 4 illustrates a schematic of the dual redundant FTRs. Each FTR 400 includes identical transceivers 402 and 404. The transceivers 402 and 404 operate in parallel (i.e., concurrently) and in synchronization with each other. Parallel, redundant data streams 406 and 408 may enter the FTR 400, asynchronously. For example, data 406 enters the transceiver 402 through an interface 414. The interface 414 includes checking logic that can utilize an error detection algorithm, such as a CRC algorithm, to determine whether or not the data 406 is "good" or "bad." If the asynchronous data 406 is determined by the interface 414 to be "good," the interface 414 transmits the data to (First In First Out or other type of buffer) FIFOs 422 and 424. Likewise, the redundant asynchronous data 408 enters the transceiver 404 through an interface 418. The interface 418 includes checking logic that can utilize an error detection algorithm, such as a CRC algorithm, to determine whether the data 408 is "good" or "bad". If the interface 418 determines that the asynchronous data 408 is "good," the interface 418 provides the asynchronous data 408 through FIFOs 420 and 426. The asynchronous data 406 and 408 is compared via comparators 428 and 430, respectively. If the data matches, the asynchronous data 406 and 408 then is synchronously transmitted from the FTRs via interfaces 432 and 434, respectively. If the asynchronous data 406 and 408 do not match, the interfaces 432 and 434 transmit the asynchronous data that was transmitted in the redundant parallel data path that was assigned as "active" in a synchronous manner. Data in the "standby" redundant parallel data path is therefore not transmitted. This embodiment generally provides for a faster response time for non-mission critical applications. For mission-critical applications, the FTR 400 may notify a system manager (not shown) to have the source retransmit the data stream, rather than replacing the "bad" data with the "good" data.

Figure 5:
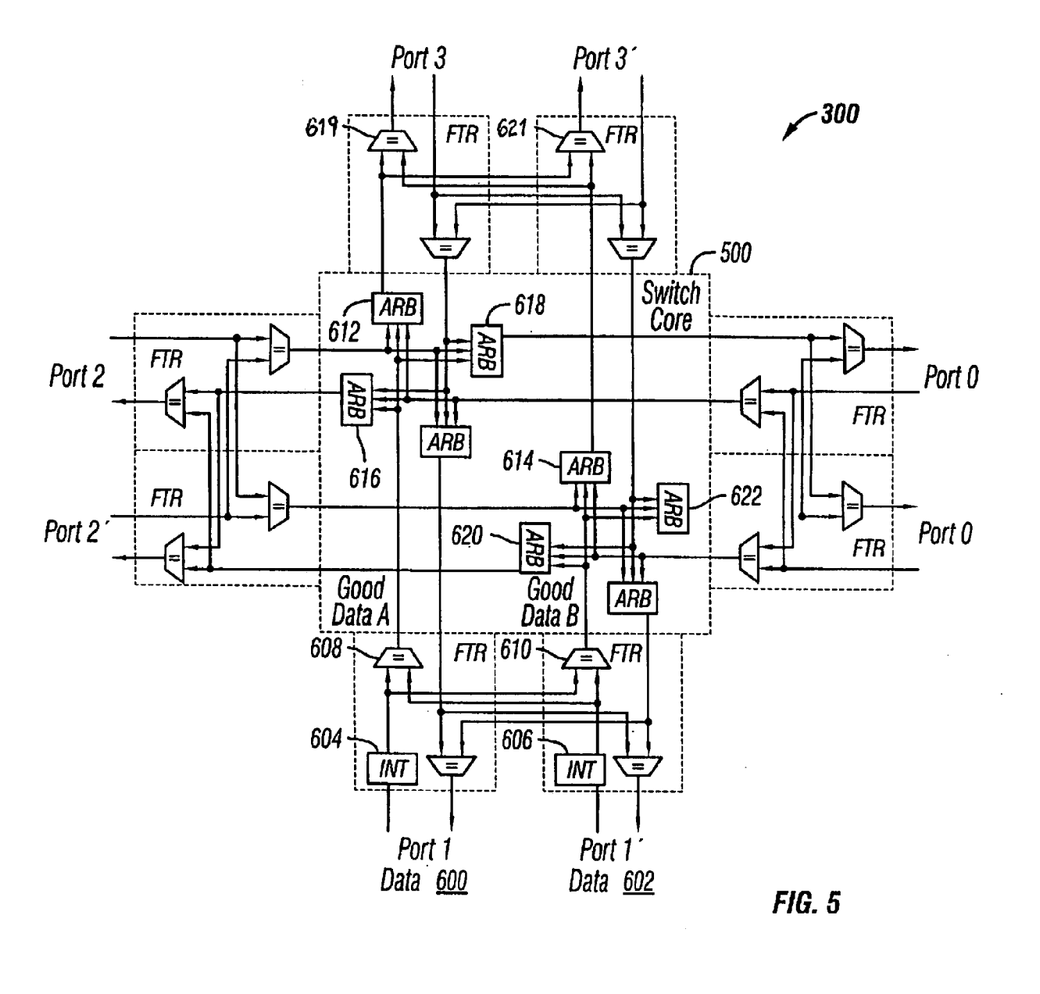
FIG. 5 is a block diagram illustrating a fault-tolerant four-port switch.

FIG. 5 illustrates a system diagram of a switch 300 incorporating FTRs. Data 600 and 602 typically are packets which include destination information. Port "non-prime" and Port "prime" represent dual redundant ports. For example, Port 1 and Port 1' represent dual redundant input ports while Port 3 and Port 3', represent dual redundant output ports. Regarding the data 600, the data 600 enters port 1 of the fault-tolerant switch 300. The interface 604 determines whether the data 600 is "good" or "bad" data via an error detection algorithm, such as a CRC algorithm. If the data 600 is determined to be "good" data by the interface 604, the interface 604 presents the data to comparators 608 and 610. Likewise, data 602 enters the fault-tolerant switch 300 via port 1' via interface 606. The interface 606 determines whether or not the data 602 is "good" or "bad" via an error detection algorithm, such as a CRC algorithm. If the data 602 is determined to be "good", the interface 606 transmits the data to comparators 608 and 610. The comparators 608 and 610 determine whether or not the data 600 and 602 are equal. If the data 600 and the data 602 is equal, the comparator 608 presents the data to arbiters (ARB) 612, 616, and 618. Depending upon the destination information in the data 600, ARIBs 612, 616, and 618 will provide the data 600 to its corresponding comparator. Thus, for example, if the data 600 includes a destination identifier for port 3, ARB 616 and 618 will ignore the data 600. The ARB 612 will transmit the data to its corresponding comparator 619. Since each of the ports include dual redundant inputs/outputs, fault-tolerant capabilities are achieved. Any pair of incoming ports of the switch 300 may be configured as redundancy incoming ports, and any pair of outgoing ports of the switch 300 may be configured as redundant outgoing ports.

Likewise, the comparator 610, compares the data 600 and the data 602, if the data 600 and the data 602 are both determined to be "good" by interfaces (NT) 604 and 606, respectively. The comparator 610 forwards the data to ARB 614, 620 and 622. Thus for example, if the destination information of the data 602 is port 3', the ARB 620 and 622 will not forward the data 602. The ARB 614 will forward the data 602 to the comparators 619 and 621. As mentioned previously, a data path is arbitrarily identified as "active" or "standby." Therefore, for example, if the data path coupled to port 1 is assigned as an "active" data path, data 600 and 602 are determined to be "good" and data 600 and 602 are unequal, the comparator 608 and 610 will forward the data 600, since the data path coupled to port 1 was assigned as the "active" data path.

Figure 6:
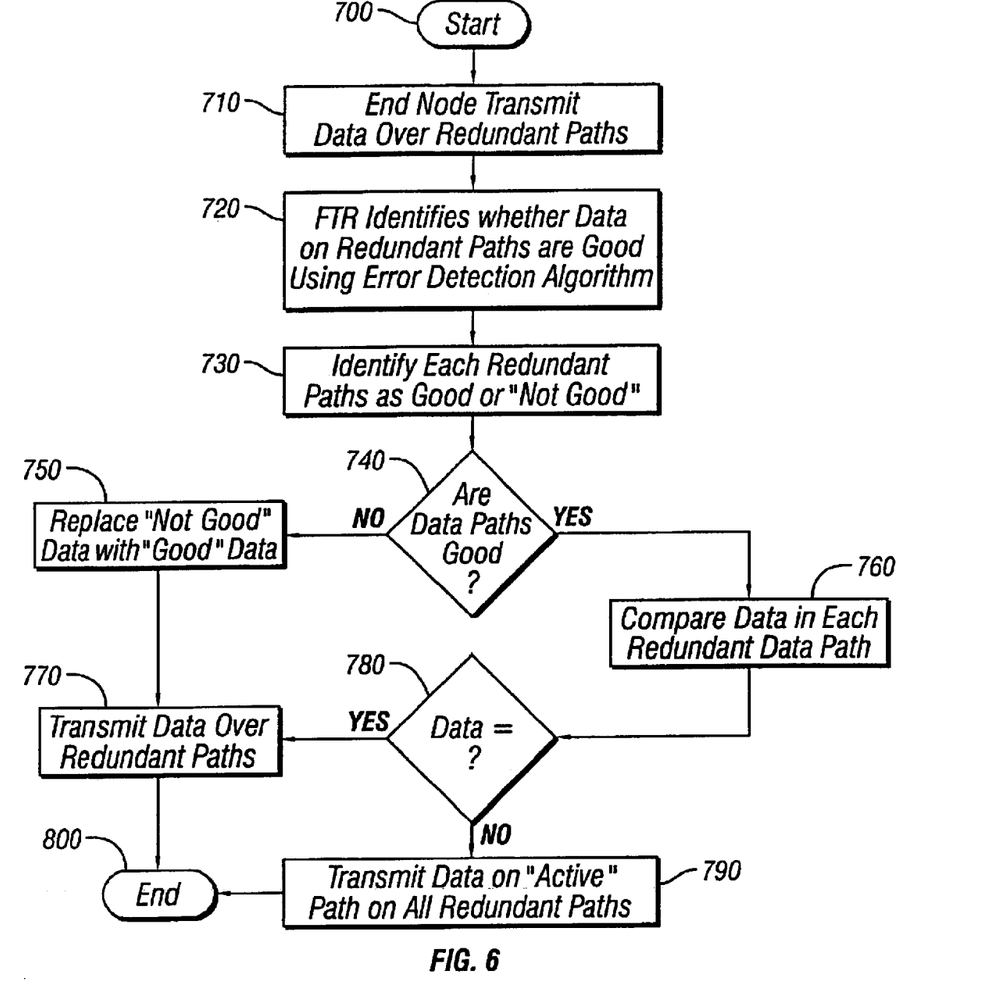
FIG. 6 is a flowchart illustrating an exemplary technique transmitting/receiving data in a fault-tolerant computer system.

FIG. 6 is a flow chart illustrating an exemplary technique of transmitting/receiving data in a fault-tolerant system. The technique starts at step 700. An end node, such as a CPU/Memory Node, a Storage Node, an I/O Node, or a Network Console Node, transmits data over redundant parallel paths at step 710. FTRs determine whether the data on each redundant parallel path is "good" or "bad" using an error detection algorithm, such as CRC, at step 720. Each data path is determined to be "good" or "bad", at step 730. At step 740, the data paths are determined as "good" or "not good" depending upon the good/bad designation of their data. If the data paths are both determined to be "good", the data on each data path is compared with one another, at step 760. If one of the data paths is identified as "bad", data from the "good" path is inserted into the path identified as "bad", at step 750. The good data is transmitted on both paths, at step 770 and the technique ends at step 800. If the data from both paths are equal at step 780, the respective FTR transmits data on both paths at 770, and the technique ends at step 800. If the data is not equal at step 780, the FTR transmits on both paths, data from the "active" data path with the technique ending at step 800.

Figure 6A:
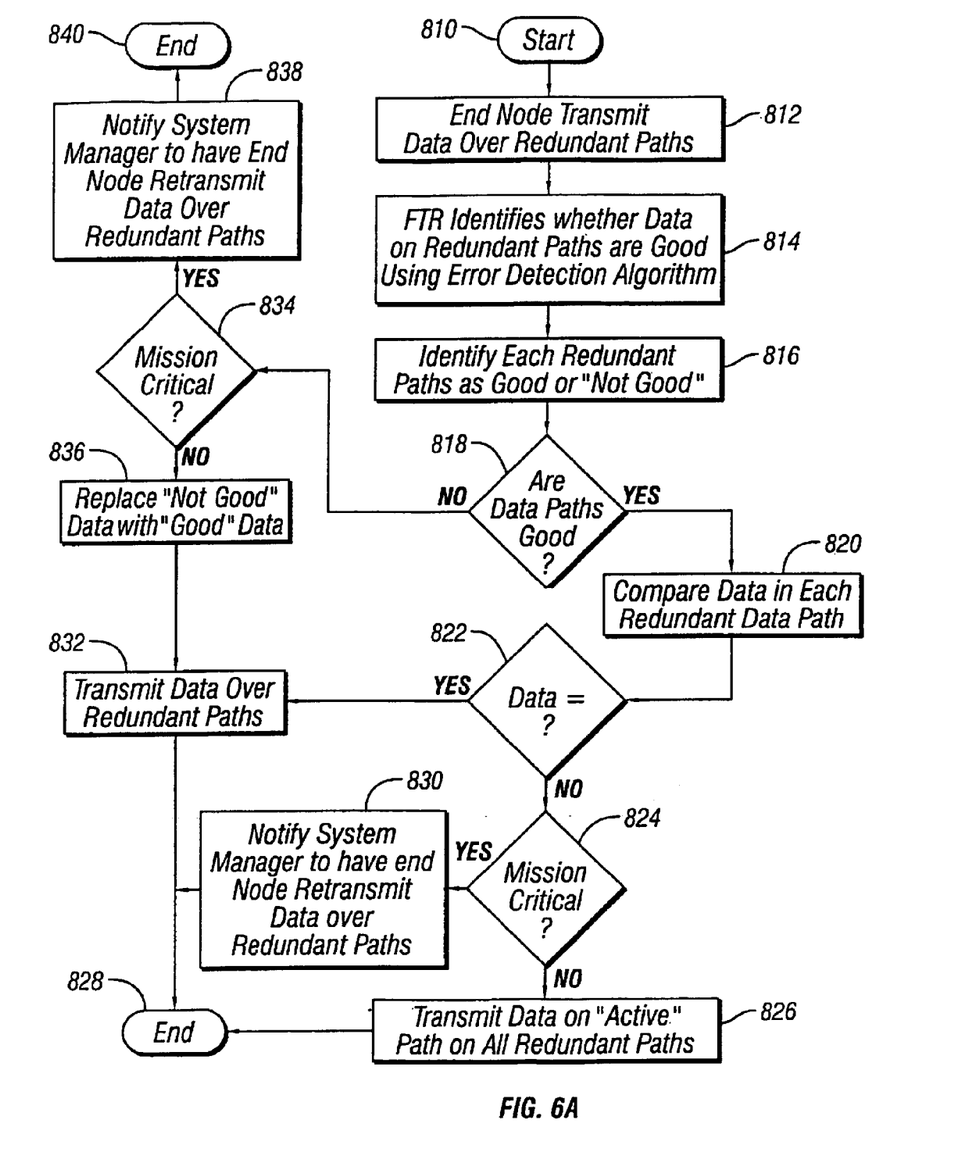
FIG. 6A is a flowchart illustrating an exemplary technique transmitting/receiving data in a fault-tolerant computer system.

FIG. 6A is a flow chart illustrating an another exemplary technique of transmitting/receiving data in a fault-tolerant system. The technique is similar to the technique illustrated in FIG. 6. However, at certain steps, the technique ascertains whether the application is mission critical.

The technique starts at step 810. An end node, such as a CPU/Memory Node, a Storage Node, an I/O Node, or a Network Console Node, transmits data over redundant parallel paths at step 812. FTRs determine whether the data on each redundant parallel path is "good" or "bad" using an error detection algorithm, such as CRC, at step 814. Each data path is determined to be "good" or "bad", at step 816. At step 818, the data paths are determined as "good" or "not good" depending upon the good/bad designation of their data. If the data paths are both determined to be "good", the data on each data path is compared with one another, at step 820. At step 822, if the data from both paths are equal, the respective FTR transmits the data on both paths at 832, and the technique ends at step 828. If the data from both paths are not equal at step 822, a decision is made at step 824 to determine whether the mode of operation for the application is mission critical. At step 824, if the mode of operation is not mission critical, the FTR transmits on both paths, data from the "active" data path at step 826. The technique ends at step 828. At step 824, if the mode of operation is mission critical, the FTR notifies the system manager to have the end node to retransmit the data at step 830. The technique ends at step 828.

At step 818, if one of the data paths is identified as "bad", a decision is made at step 834 to determine whether the mode of operation for the application is mission critical. If the application is not mission critical, the data from the "good" path is inserted into the path identified as "bad", at step 836. The data is transmitted over the redundant paths at step 832 and the technique ends at 828. If the application is determined to be mission critical, the FTR notifies the system manager to have the end node retransmit the data over the redundant paths, at step 838. The technique ends at step 840.

In another embodiment, once an FTR or fault-tolerant switch detects a redundant data path to be unusually faulty, the FTR or fault-tolerant switch can send an error message to a system manager, such as the Network Console 110. The Network Console 110 can reconfigure the redundant parallel data paths to ensure fault-tolerancy and reliability.

Furthermore, in another embodiment, the computer network N, can be an InfiniBand™ network (The InfiniBand™ network is described in a paper, entitled Technology Brief, InfiniBand Architectural Technology, Compaq Computer Company, July 2000, herein incorporated by reference). The port of each fault-tolerant switch can include a Port Globally Unique ID (GUID). The fault-tolerant switch can be configured so that the redundant parallel ports can appear as only one port in the computer network N. In addition, each port of an end node also has a Port GUID. The ports of the end node port can be configured with an identical GUID so that the end node can generate identical outgoing data.

In an InfiniBand™ network, fault tolerant data cannot be transmitted simultaneously. Typically, when a receiving device, such as an end node or switch, receives faulty data (incorrect CRC), the InfiniBand™ protocol allows the retransmission of data if requested, or if triggered by a timeout condition, both known as a fail-over feature. The InfiniBand™ network's fail-over feature requires additional time to retransmit "good" data. In contrast, the fault tolerance techniques described above provide zero-latency fail-over since redundant data is transmitted in parallel through the computer network N.

The foregoing disclosure and description of the various embodiments are illustrative and explanatory thereof, and various changes in the redundancy, error checking, switch architecture, end nodes, data paths, ports, FIFOs, interfaces, and comparators, as well as the details of the illustrative circuitry and construction and method of operation may be made without departing from the spirit of the invention.

We claim:

1. A fault-tolerant computer network, comprising:
    a plurality of end nodes;
    a plurality of fault-tolerant switches that are coupled to the plurality of end nodes; and a plurality of redundant parallel data paths coupling the plurality of end nodes to the plurality of fault-tolerant switches and carrying redundant data streams, wherein each fault-tolerant switch is connected to at least first and second input data paths and at least first and second output data paths, each fault-tolerant switch is adapted to:

receive at least first data and second data over respective first and second input data paths, the first data and second data being redundant;

detect whether the first data is erroneous and the second data is good; and in response to detecting the first data is erroneous and the second data is good, send the second data over both the first and second output data paths instead of sending the first data over the first output data path and the second data over the second output data path.

2. The fault tolerant computer network of claim 1, wherein the plurality of end nodes comprise fault-tolerant nodes.

3. The fault-tolerant computer network of claim 1, each fault-tolerant switch comprising;

a fault-tolerant repeater comprising transceivers operating in parallel with one another.

4. The fault-tolerant computer network of claim 3, wherein the fault-tolerant repeater comprises a plurality of redundant parallel ports.

5. The fault-tolerant computer network of claim 3, wherein the fault-tolerant repeater determines if the data stream on the data path is good using an error detection algorithm.

6. The fault-tolerant computer network of claim 5, wherein the error detection algorithm is a cyclical redundancy checking (CRC) algorithm.

7. The fault-tolerant computer network of claim 1, wherein one of the plurality of redundant parallel data paths is assigned as an active redundant parallel data path and the remaining plurality of redundant parallel data paths are assigned as standby redundant parallel data paths.

8. The fault-tolerant computer network of claim 7, wherein if the fault-tolerant repeater determines that the data is good on all of the plurality of redundant parallel data paths, the fault-tolerant repeater transmits the data from the active redundant parallel data path on all of the redundant parallel data paths.

9. The fault-tolerant computer network of claim 1, wherein the plurality of redundant parallel data paths comprise two redundant parallel data paths.

10. The fault-tolerant computer network of claim 9, wherein one of the plurality of end nodes is a processor/memory node.

11. The fault-tolerant computer network of claim 9, wherein one of the plurality of end nodes is a storage node.

12. The fault-tolerant computer network of claim 1, wherein each fault-tolerant switch is adapted to further:

in response to detecting that both the first data and second data are good, compare the first data and the second data; and in response to determining that the first and second data do not match, select one of the first and second data that is associated with an active path to send out over both the first and second output data paths.

13. The fault-tolerant computer network of claim 1, wherein each fault-tolerant switch includes checking logic to apply an error detection algorithm to detect whether the first and second data are erroneous or good.

14. The fault-tolerant computer network of claim 1, wherein each fault-tolerant switch is adapted to further:

in response to detecting that both the first and second data are good, compare the first and second data; and in response to determining that the first and second data do not match, (a) select one of the first and second data that is associated with an active path to send out over both the first and second output data paths for a non-mission critical application; and (b) notify an entity to have the first and second data retransmitted for a mission-critical application.

15. The fault-tolerant computer network of claim 1, wherein each fault-tolerant switch is adapted to receive the first and second data asynchronously.

16. The fault-tolerant computer network of claim 15, wherein each fault-tolerant switch sends the first and second data over both the first and second output data paths in a synchronous manner.

17. A fault-tolerant computer network, comprising:

a plurality of end nodes;

a plurality of fault-tolerant switches that are coupled to the plurality of end nodes; and a plurality of redundant parallel data paths coupling the plurality of end nodes to the plurality of fault-tolerant switches and carrying redundant data streams, each fault-tolerant switch comprising a fault-tolerant repeater comprising transceivers operating in parallel with one another, each fault-tolerant repeater to determine whether data is bad or good, wherein if the fault-tolerant repeater determines that the data is bad, the fault-tolerant repeater replaces the bad data with good data, and transmits the good data on all of the redundant parallel data paths.

18. A fault-tolerant repeater, comprising:

a plurality of transceivers operating in parallel with one another;

a plurality of inputs coupled to the plurality of transceivers;

a plurality of outputs coupled to the plurality of transceivers; and a checking logic coupled to the plurality of transceivers to determine whether an incoming redundant parallel data stream is good data and to provide the good data at the plurality of outputs.

19. The fault-tolerant repeater of claim 18, wherein the plurality of inputs comprises two inputs and the plurality of outputs comprises two outputs.

20. The fault-tolerant repeater of claim 18, wherein the checking logic employs an error detection algorithm to determine whether the incoming redundant parallel data stream is good data.

21. The fault-tolerant repeater of claim 20, further comprising:

a plurality of comparators to determine whether the incoming redundant parallel data stream matches another incoming redundant parallel data stream.

22. The fault-tolerant repeater of claim 18, wherein the checking logic is adapted to receive at least first data at a first input and at least second data at a second input, and detect whether the first data is erroneous and the second data is good, the fault-tolerant repeater further comprising interface logic adapted to, in response to detecting that the first data is erroneous and the second data is good, send the second data over at least first and second outputs instead of sending the first data over the first output and the second data over the second output.

23. The fault-tolerant repeater of claim 22, wherein the interface logic is adapted to:
   in response to detecting that both the first data and second data are good, compare the first data and the second data; and
   in response to determining that the first and second data do not match, select one of the first and second data that is associated with an active path to send out over both the first and second outputs.

24. The fault-tolerant repeater of claim 22, wherein the interface logic is adapted to:
   in response to detecting that both the first and second data are good, compare the first and second data; and
   in response to determining that the first and second data do not match,
      (a) select one of the first and second data that is associated with an active path to send out over both the first and second outputs for a non-mission critical application; and
      (b) notify an entity to have the first and second data retransmitted for a mission-critical application.

25. A method of transmitting data stream in a fault-tolerant computer network, comprising the steps of:
   transmitting a data stream from an end node over a plurality of redundant parallel data paths;
   identifying at least a first data path of the plurality of redundant parallel data paths with a good data stream and at least a second data path of the plurality of redundant parallel data paths with a bad data stream; and
   transmitting the good data stream over the plurality of redundant parallel data paths.

26. The method of claim 25, further comprising the step of:
   assigning at least one of the plurality of redundant parallel data paths as an active redundant parallel data path.

27. The method of claim 25, wherein the identifying step employs an error detection algorithm.

28. The method of claim 25, wherein the end node is an input/output (I/O) node.

29. The method of claim 25, the step of transmitting the good data stream comprising the step of:
   transmitting the good data stream over the plurality of redundant parallel data paths, when one of the redundant parallel data paths is identified as bad.

30. The method of claim 25, wherein transmitting the good data stream over the plurality of redundant parallel data paths comprises transmitting the good data stream over at least first and second output data paths instead of transmitting the first data over the first output data path and the second data over the second output data path.

31. The method of claim 30, further comprising:
   identifying a third data path of the plurality of redundant parallel data paths with a good data stream;
   comparing the good data streams of the first and third data paths; and
   in response to determining that the good data streams of the first and third data paths do not match, select one of the good data streams of the first and third data paths that is associated with an active path to send out over the plurality of redundant parallel data paths.

32. A method of fault-tolerant computing, comprising:
   configuring a plurality of incoming ports of a switch as a plurality of redundant incoming ports;
   configuring a plurality of outgoing ports of the switch as a plurality of redundant outgoing ports;
   receiving at least first data and second data at the plurality of incoming ports;
   detecting the first data is erroneous and the second data is good; and
   sending the second data over the plurality of outgoing ports instead of sending the first data and second data over respective ones of the plurality of outgoing ports.

33. The method of claim 32, wherein the plurality of redundant incoming ports comprises a pair of redundant incoming ports.

34. The method of claim 32, wherein the plurality of redundant outgoing ports comprises a pair of redundant outgoing ports.

35. The method of claim 32, further comprising:
   configuring at least one incoming port of the plurality of redundant incoming ports as an active redundant incoming port; and
   configuring at least one incoming port of the plurality of redundant incoming ports as a standby redundant incoming port.

36. The method of claim 32, further comprising:
   configuring at least one outgoing port of the plurality of redundant outgoing ports as an active redundant outgoing port; and
   configuring at least one outgoing port of the plurality of redundant outgoing ports as a standby redundant outgoing port.

* * * * *